United States Patent [19]

Frias et al.

[11] 4,456,201
[45] Jun. 26, 1984

[54] REEL-TO-REEL DRIVE SYSTEM

[75] Inventors: Ronald J. Frias, Milwaukee; David Jagielski, Kewaskum, both of Wis.

[73] Assignee: Micron Corporation, Iron Ridge, Wis.

[21] Appl. No.: 438,378

[22] Filed: Nov. 1, 1982

[51] Int. Cl.$^3$ .......................... G03B 1/04; G11B 15/32
[52] U.S. Cl. ...................................... 242/203; 242/205; 353/26 R
[58] Field of Search .............................. 242/201–205, 242/67.4; 74/665 R, 665 A, 665 B, 665 E; 352/124, 72; 353/26 R, 26 A

[56] References Cited

U.S. PATENT DOCUMENTS

| | | | |
|---|---|---|---|
| 2,604,271 | 7/1952 | Moomaw | 242/205 |
| 2,718,361 | 9/1955 | Evraets | 242/203 |
| 3,707,326 | 12/1972 | Kadowaki | 352/124 |
| 3,947,187 | 3/1976 | Murray, Jr. | 352/72 |
| 4,012,134 | 3/1977 | Silver et al. | 353/26 R |

Primary Examiner—Leonard D. Christian
Attorney, Agent, or Firm—Andrus, Sceales, Starke & Sawall

[57] ABSTRACT

A film reader includes individual drive systems for driving a storage reel to rewind a film strip and a take-up reel to unwind the film strip by pulling the film strip from the opposite reel. Each drive system is the same and includes a fast drive motor and a slow drive motor. A speed reduction pulley train has a first stage and a second stage connected in series with a first stage output pulley in drive coupling to an input pulley of the second stage by a one-way clutch. A slow speed motor is connected to the first stage. A one-way clutch connects a high speed motor in drive coupling to the opposite side of the input pulley. The output shaft is connected to the pulley train by a spring output clutch having a pulsed release control to disconnect the output shaft from the pulley train and permit free rotation thereof. The output clutch has a first drive coil wound on the shaft when driven and a second larger coil with the outer end turn slidably engaging a hub, which is reversely rotated to release the drive coil. Each one-way clutch is a simple wire coil wrapped about a shaft and having an end coupled to the driving member such that it winds the coil onto the shaft to transmit the rotation. A solid state control includes a switch unit having an interlock to insure proper setting of the output clutches before switchover of the drive systems.

21 Claims, 11 Drawing Figures

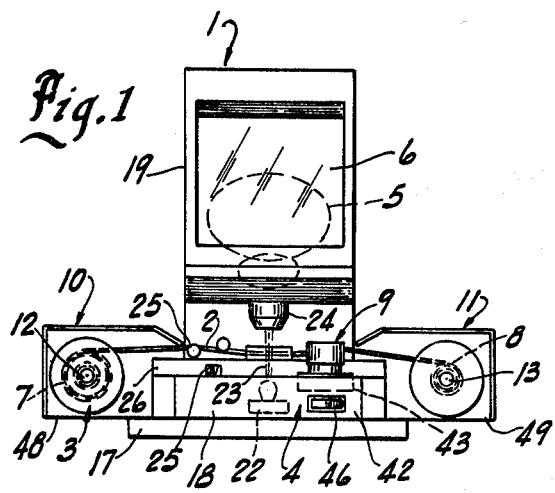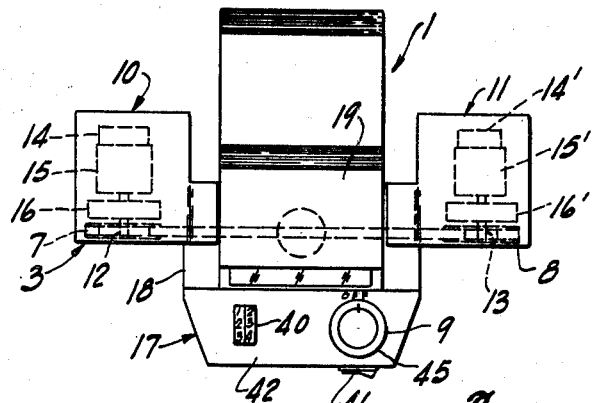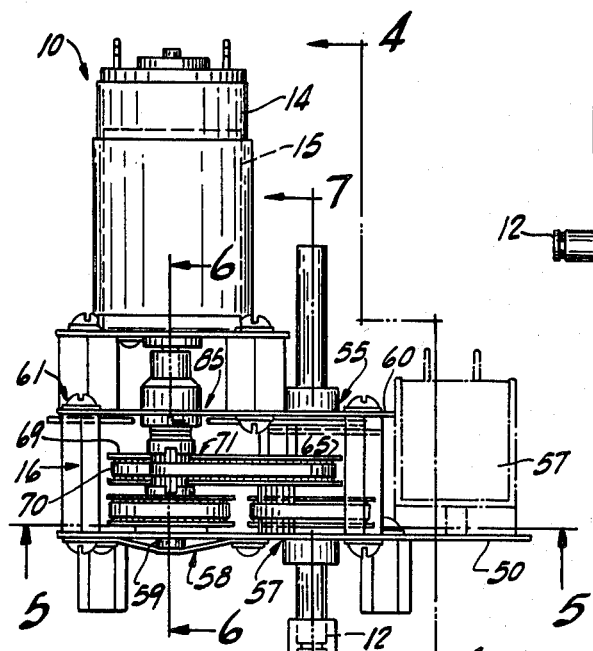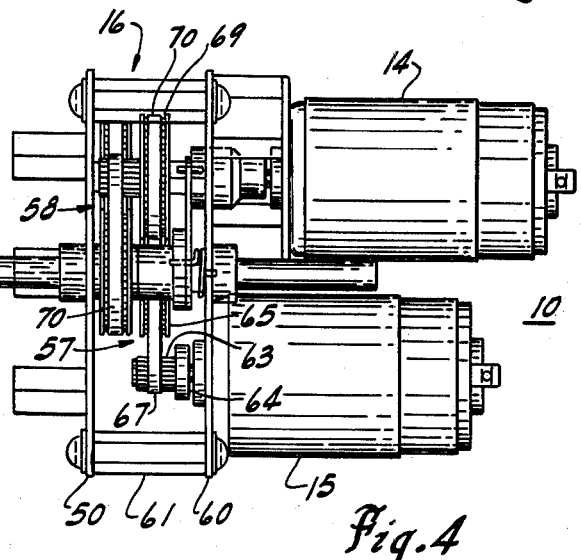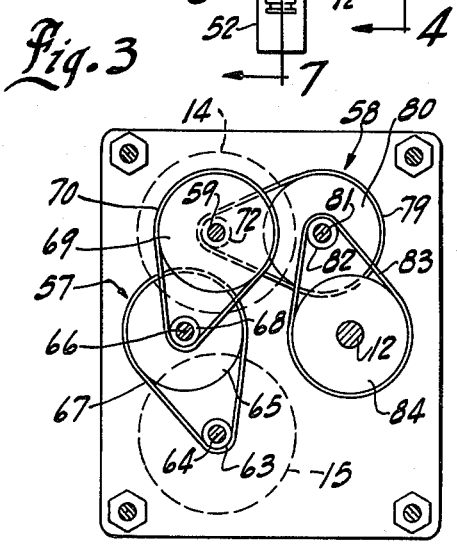

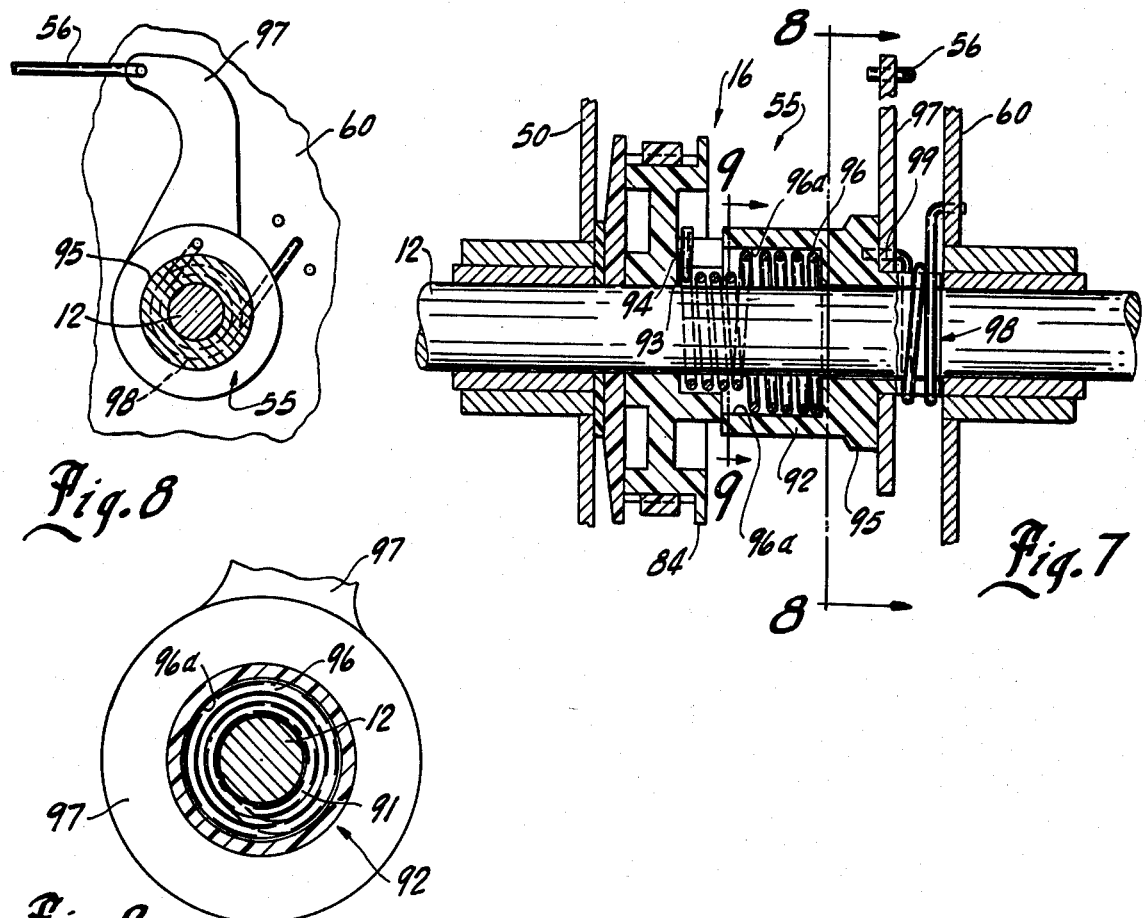
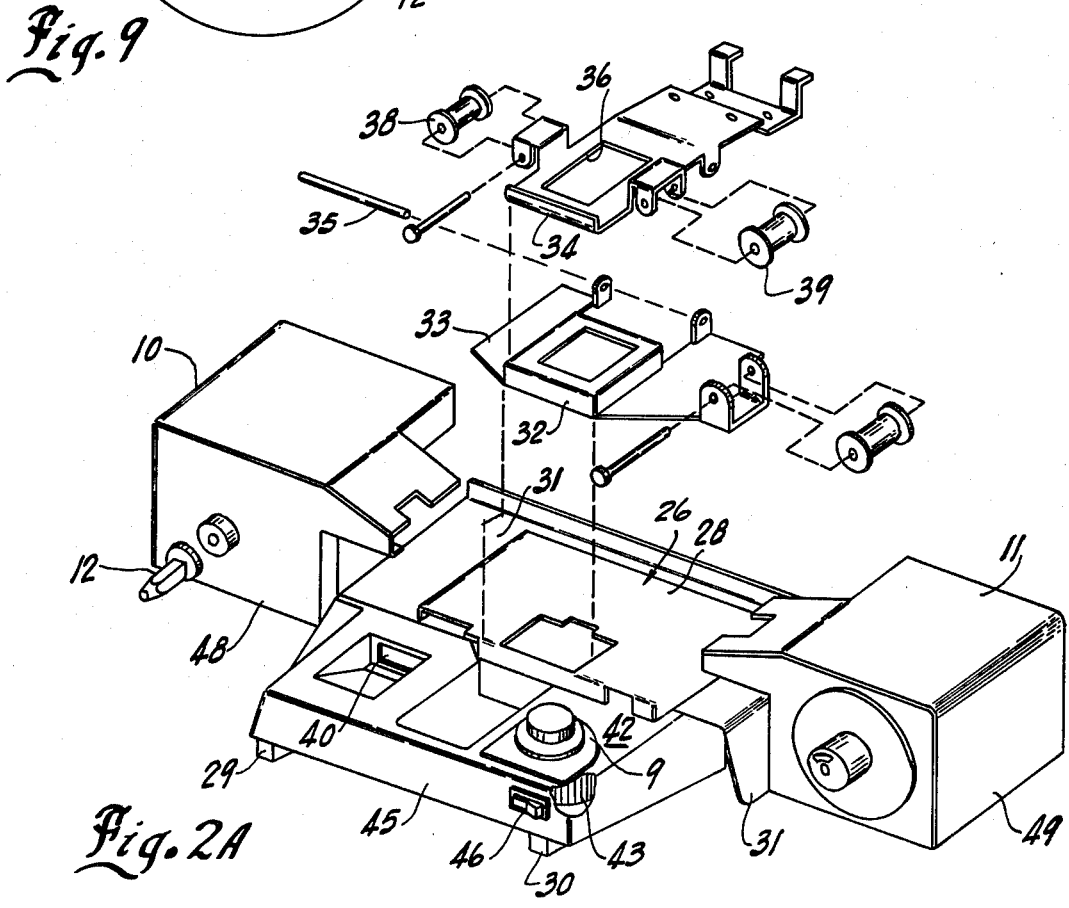

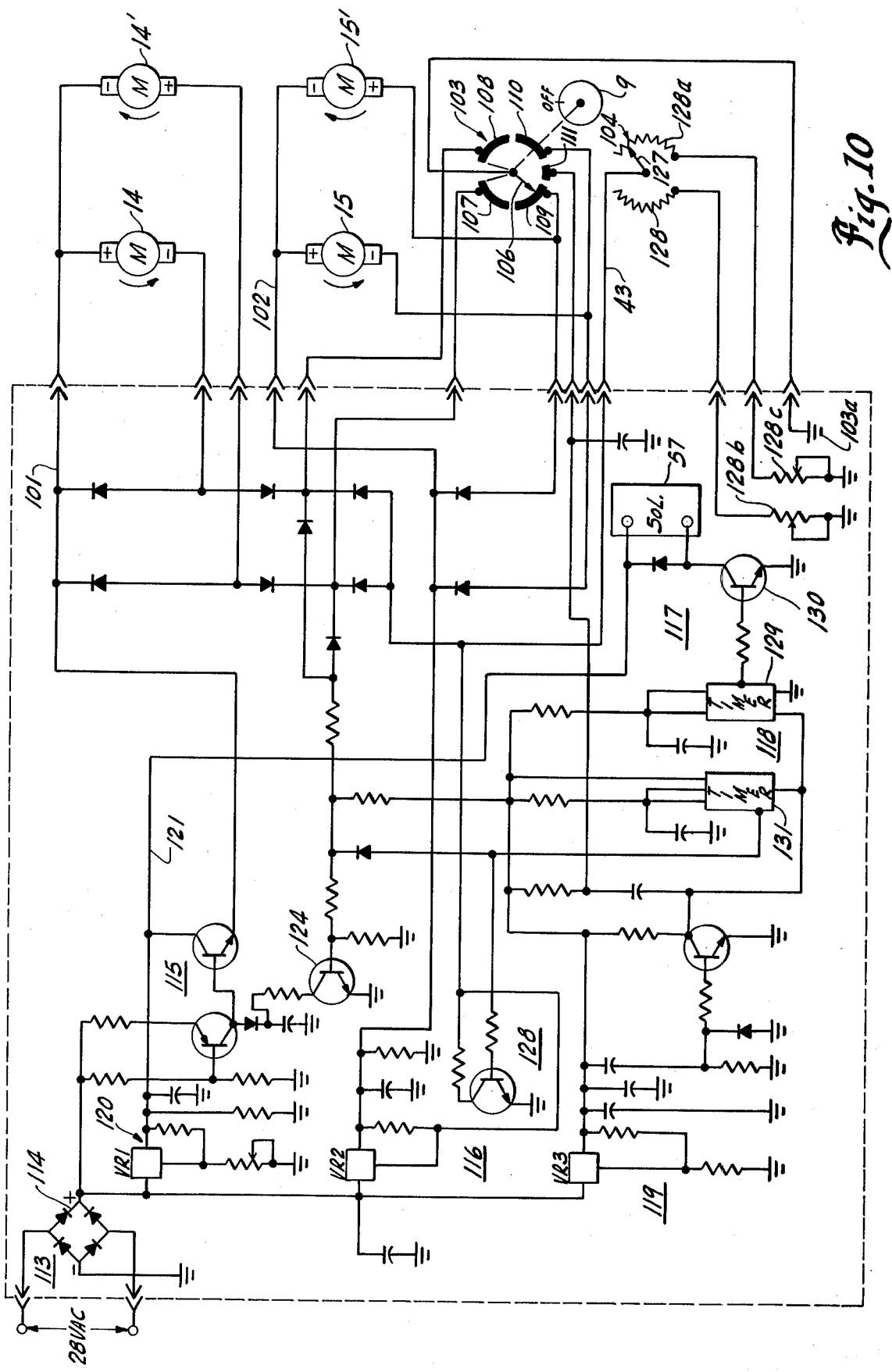

REEL-TO-REEL DRIVE SYSTEM

BACKGROUND OF THE PRESENT INVENTION

This invention relates to a reel-to-reel drive system and particularly such apparatus adapted for transfer of a film strip between two spaced reels.

Information is conveniently stored on film to provide compact storage means. For example, hundreds of normal sized pages may be stored on a single 3×5 film fiche sheet, commonly identified as a microfiche or more recently a higher density card ultrafiche. A simple card file may therefore store a substantial library of information and books with convenient and ready access thereto. A special optical reader is provided for enlargement of any given page stored on any given card. A hard copy of the enlarged material is conveniently provided by providing the reader with a printer. For example, the inventor's issued U.S. Pat. No. 4,322,158 which issued Mar. 30, 1982 entitled "Thermal Film Developing Apparatus" discloses a reader-printer apparatus for microfiche cards or the like.

In addition to the fiche cards, photographic film rolls, usually in the form of a reel, a cartridge or a cassette, are widely used. In such a storage medium, multiframe film strip is wound on a reel with successive film frames carrying the reduced images. The film roll is housed on a reel which may be suitably mounted within a suitable cassette or cartridge. A film reader includes a suitable optical enlargement means for enlarging of the material on a film frame and displaying thereof on viewing screen. The cartridge that is releasably held in place and a film drive is coupled to the film reel and includes means to automatically withdraw the end of the strip from the cartridge and pass it into and through the projection unit to a take-up reel on the opposite side of the projection unit. The take-up reel is coupled to a multiple speed drive system to be separately driven in such a direction as to wind the film from the cassette onto the reel. The cartridge unit is also adapted to be reversely driven to rewind the film strip. This permits the user to rapidly transfer the film strip through the projection unit for aligning of the desired frame of the film strip in the projection unit. As in the fiche reader, a printer is advantageously associated with the reader for production of a hard copy of any given frame of the projected material.

A microfiche reader and/or printer reader is normally manually loaded and unloaded and does not have the requirement of the cartridge drive system. However, many users may have both a microfiche storage and/or film cassette storage. A single printer-reader which is adapted to both microfiche and film strip would be desirable to minimize and simplify manufacture and inventory requirements as well as to minimize equipment cost of the end user. Thus, form a manufacturing standpoint, the inventors have recognized the advantage of a single printer-reader in combination with separate adaptors for fiche systems and for film strip reel systems. The purchaser can be offered a basic printer-reader with either or both of the adaptors in order to match the system capability to the system used.

Such adapted systems are available, but the drive systems are relatively complex and costly. Various such dual systems have been developed, for example, using a single motor with suitable couplings for driving the cartridge and the take-up reel.

In a film strip system, the drivers uniformly provide for dual speed movement including a rapid transfer mode to permit movement of the film to the desired frame area in a rapid manner. A slower speed drive mode is also permitted for accurate location of a given frame. The shifting system must therefore include various clutchings and gear systems to permit both rapid and slow speeds in both of selective forward and reverse drive connections. The control is preferably constructed with a single unit control, such as a rotary dial. The mechanical shifting mechanisms to control the transfer of the film strip may be relatively complex and therefor costly to construct and to maintain.

There is a need for an improved reversible, multiple speed drive system for reel-to-reel applications and particularly in the information storage art. Although particularly applicable to film storage systems, other data systems which use other elongated elements for information storage may present similar problems of rapid access and accurate location, and the present invention may of course be applied to such other fields. The drive system should have a long operating life in view of the substantial usage and the importance of the application. However, the system must have significant cost effectiveness in order to replace the conventional hard copy storage.

SUMMARY OF THE PRESENT INVENTION

The present invention is particularly directed to a compact, multiple speed drive for reel-to-reel transfer apparatus and particularly adapted to interchange of a data storage film or strip between a storage reel and a take-up reel. Generally in accordance with the teaching of the present invention, each reel is provided with a similar individual drive system, with suitable interlocking means to permit drive actuation of a single one of the drive systems at any given time. Each drive system is uniquely constructed and includes a fast drive motor and a separate slow drive motor. The drive motors are coupled to each other and to a single corresponding output shaft to produce rotation of the shaft in a proper direction. The coupling system or train is uniquely constructed with a first reduction stage and a second reduction stage connected in series with a drive from the one motor through The total coupling train to the output shaft and a second drive from the second motor through only the second stage of the coupling train. The first and second stages are connected such that the first stage of the coupling system and the low speed motor are automatically decoupled from the second stage when the high speed motor is energized and preferably further includes means for automatic decoupling of the high speed motor when the opposite low speed motor is energized. In a practical application, the reduction of the coupling system included a pulley system or train. The pulley train is preferable to provide construction with minimum noise, but any other suitable train such as an inexpensive gear train system may of course be used if considered desirable. The drive train provides connection of the slow speed motor through the first stage of the coupling system such that the energization of the low speed motor drives both of the first and second stages and creates a relatively substantial reduction in speed, whereby the reel output shaft operates at a relatively low speed. The high speed motor is connected into the common connection of the two stages and thus to the output shaft in series with only the second stage to provide a substantially smaller reduction in the speed of the output shaft such that the reel is rotated at a substantially higher speed. The pulley system includes suitable pulley belts preferably having integral cleat-like engagements for positive torque transfer and further includes a one-way clutch means to operatively de-couple the high speed motor when the low speed motor is energized, and to operatively de-couple the first stage of the pulley system between the low speed motor and the high speed motor in response to the operation or energization of the high speed motor. Thus, during a high speed mode, the coupling train and low speed motor do not load the system and results in an efficient reliable drive. This permits the direct drive connection of the coupling system to the motors, and in particular, a simple pulley drive which includes a series of inexpensive pulley drive wheels of the different sizes and similar connecting teethed pulley belts. The selective energization of the motors directly provides the desired alternate high speed and low speed reel drives.

The drive system is constructed for either the conventional available sixteen millimeter of thirty-five millimeter film sizes. The take-up reels are of course properly sized and releasably attached to the take-up drive. The motors can be small, simple, inexpensive, one way rotational motors interconnected into the reel shaft by the simple pulley drive train. This also permits a small, compact direct drive for each of the reels.

In the reversible reel-to-reel film drive assembly, each reel is separately driven to correspondingly move the film strip onto the corresponding reel. The other reel drive system is disconnected from the output shaft to prevent loading of the movement thereby. In a preferred embodiment, each output shaft is coupled to the corresponding reel drive train through a clutch mechanism. A control is coupled thereto and is operative to effectively de-couple the appropriate opposite output shaft in response to the corresponding energization of the drive motor for the opposite reel drive systems.

More particularly in a preferred and practical embodiment of the present invention, the separate drive systems are interconnected by a film strip guide unit which is adapted to be located within a projection system of a film strip reader. Each of the drive systems is identically constructed with the corresponding pulley drive trains and drive motors. The pulley drive train is located within a suitable support structure with the two motors correspondingly secured to the support structure with the motor shafts directly coupled into the drive train. In each drive train, small pulleys are coupled to the respective motor shafts and belt-coupled to a relatively large pulley. Each stage includes a second small pulley secured to the first large pulley and a second large pulley which is belt-coupled to maintain continuity of the train. The second large pulley of the first stage is coupled by a one-way clutch to one side of the first small pulley of the second stage and the high speed motor is coupled to the opposite side of such first small pulley by a one-way clutch. Thus, when the slow speed motor is energized, the first and second stages of the pulley train are driven, resulting in a desired low speed, which can be adjusted with a range by varying the energization level of the motor. The high speed motor is de-coupled by the one-way clutch between the motor and the small pulley. When the high speed motor is energized, the second stage only is driven, resulting in the higher output speed, which can be adjusted within a range by varying energization of the high speed motor. The one-way clutch between the large pulley of the first stage and the small input pulley of the second stage disengages by the forced rotation of the small pulley, and driving of the first stage and the interconnected slow speed motor is prevented. In accordance with a preferred and optimum construction of the present invention, each one-way clutch is a simple wire-wound unit including a wire coil wrapped about the common shaft and having an end member coupled to the driving member. Energization of the high speed motor, for example, results in the rotation of the spring with a tendency to wind the coil spring onto the shaft connected to the input pulley and thereby transmitting of the motor output to the common input pulley.

Each output shaft is also coupled to the output pulley of the pulley train by a spring clutch. The clutch includes a spring having a few small diameter coils to grip the shaft for driving and several internal larger diameter coils adapted to slide within a control hub which, when reversely rotated, will release the tension on the smaller coils, and thus allow the output shaft to slip within the spring clutch. The control hubs are coupled to each other and are actuated by an electrical control for the selective operation to permit engagement of the proper output shaft for movement of the film.

A suitable solid state control circuit includes means for energizing the several motors. A particularly satisfactory circuit includes a wafer switch having contact segments for each motor, and a cross-over segment to pulse the clutch electrical control and insure switch-over of the drive unit settings and thereby reliable operation of the drive units.

The non-operating motor and pulley systems, and particularly the first stage and associated low speed motor, if retained in driven relation, would load the opposite operating motor and pulley system as well as create unnecessary wear of the then non-functioning components. The simple, one-way clutch units thus completely eliminate the loading effect and unnecessary drive of the unused components while providing automatic interconnection of the motors into the system.

The dual motors provide a small, compact multiple speed drive system which rapidly and accurately positions a film strip or other similar elongated reeled element and which can be constructed with commercially available and reliable components having a long life and a reasonable, economic cost.

DESCRIPTION OF THE DRAWING FIGURES

The drawings furnished herewith illustrate a preferred construction of the present invention in which the above advantages and features are clearly disclosed as well as others which will be readily understood from the following description.

In the drawings

FIG. 1 is a front elevational and simplified view of a film strip printer-reader incorporating a cartridge film strip drive assembly constructed in accordance with an embodiment of the present invention;

FIG. 2 is a plan view of the reader shown in FIG. 1;

FIG. 2a is an exploded view of the film guide system;

FIG. 3 is an enlarged top elevational view of a cartridge drive unit shown in FIGS. 1 and 2;

FIG. 4 is a side view taken generally on line 4—4 of FIG. 3;

FIG. 5 is a view taken generally on line 5—5 of FIG. 3;

FIG. 7 is an enlarged vertical section at view taken generally on line 7—7 of FIG. 3;

FIG. 8 is a view taken generally on line 8—8 of FIG. 7;

FIG. 9 is a view taken on line 9—9 of FIG. 7; and

FIG. 10 is a schematic circuit of a drive control for the unit of FIGS. 1-7.

DESCRIPTION OF THE ILLUSTRATED EMBODIMENT

Figure 6:
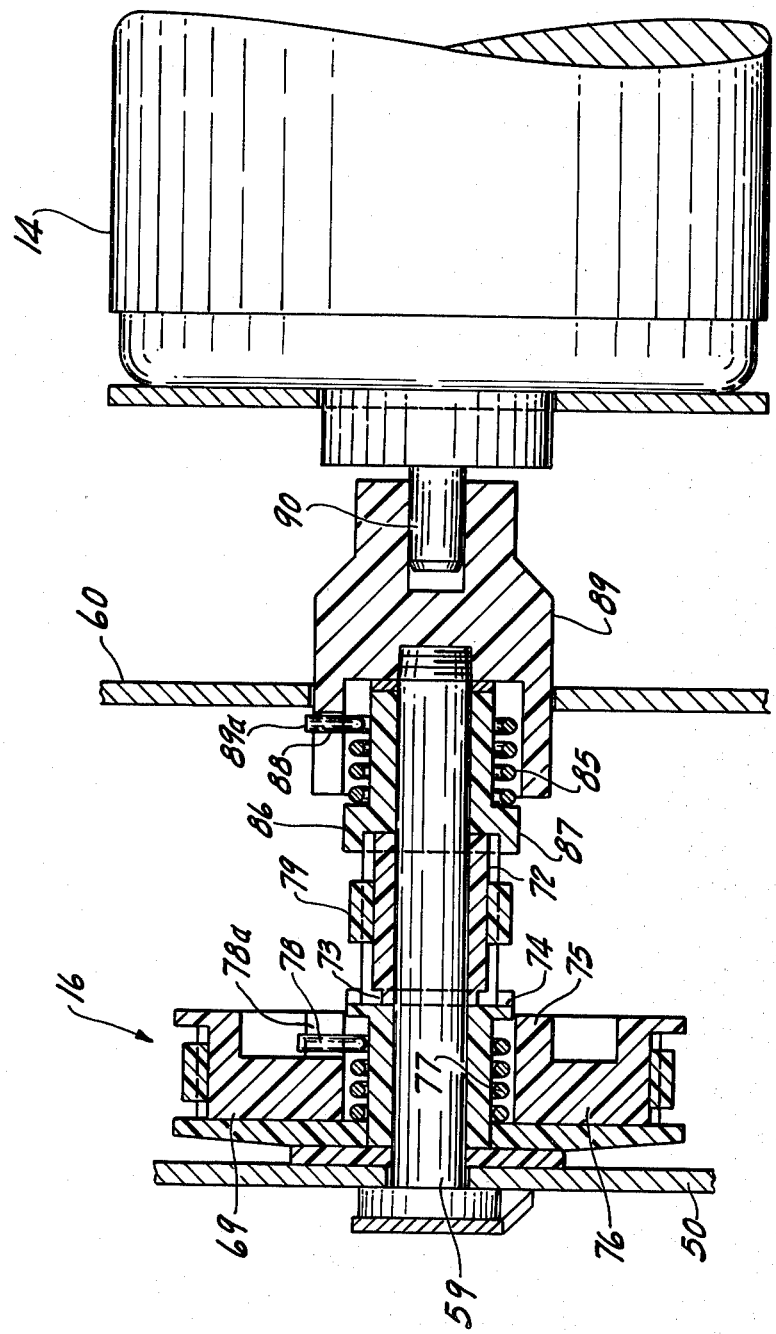
FIG. 6 is an enlarged vertical section taken generally on line 6—6 of FIG. 3.

Referring to the drawings and particularly to FIGS. 1 and 2, the present invention is illustrated applied to a film strip reader or printer-reader unit 1 for reading of a film strip 2 which is housed in a well known film reel unit 3. The film reader unit or printer-reader 1 includes a light projection section 4 through which the film strip 2 passes. The projected image 5 is displayed on a front display screen 6 for visual viewing and reading for the user. The film strip 2, in accordance with conventional and well known construction, consists of a series of integrally interconnected frames, not shown. The film strip 2 is wound on a reel 7 of reel unit 3 and is adapted to be withdrawn from the cartridge, through the projection section 4 and rewound onto a take-up reel 8 to the opposite side of the projection section 4. This permits alignment of any one of the series of frames for projection of viewing on the display screen 6. A manual control 9, shown as a rotating dial, is provided for controlling the transport of the film strip between the reel 7 and the take-up reel 8. In accordance with the present invention, a storage drive unit or assembly 10 is provided for the reel 7 and a separate assembly 11 is provided for the take-up reel 8. As shown in FIG. 2, the first or drive assembly 10 is mounted immediately behind the location of the reel unit 3 and includes an output shaft 12 coupled to the reel 7 of the unit 3. The similar second drive system 11 is mounted to the opposite side of the projection section 4 and the display screen 6 and similarly includes an output shaft 13 coupled to drive the take-up reel 8.

Each drive system 10 and 11 is similarly constructed and system 10 is described in detail hereinafter. The cartridge reel drive unit 10 is adapted to rotate the reel 7 in a counterclockwise direction, as shown in FIG. 1. This results in a pulling of a film strip 2 to the left as viewed in FIG. 1 to rewind the film strip onto the reel 7 within the unit 3. The take-up reel 8 is similarly driven and is adapted to rotate the reel 8, as viewed in FIG. 1, in a clockwise direction to wind the film strip 2 onto the reel 8. This winding action results in a pulling of the film strip 2 from the reel 7 through the projector unit 4. Referring to the reel drive system 10, a pair of drive motors 14 and 15 are operatively coupled by a pulley train 16 to rotate and drive the corresponding output shaft 12 and the associated reel 7 in a single direction. The motors 14 and 15 are similar D.C. motors, such as simple permanent magnet motors which are readily available as low cost units, and the pulley train 16 is specially constructed to reduce the speed and rotate the output shaft at an appropriate reduced speed. As more fully developed hereinafter, the drive systems 10 and 11 are preferably specially constructed to include an electrical control system adapted to be operated from the single directional and speed control knob 9 provided on the projection section 4 for controlling of the drive systems 10 and 11.

The present invention is particularly directed to the construction of the film reel drive systems, and the illustrated structure is constructed as a film reader or strip cartridge drive adaptor for attachment to a fiche printer-reader; for example, the printer-reader disclosed in the inventor's previously identified U.S. Pat. No. 4,322,158. The illustrated embodiment of the invention is shown and described with the drive units 10 and 11 forming a part of the film-strip adaptor for releasable attachment to the fiche type reader, such as shown in the above patent.

As more clearly shown in FIGS. 1 and 2, the printer-reader unit 1 includes a housing 17 having a horizontal front slot or opening defining a supporting base 18 and an upper display housing section 19. The screen 6 is secured as the front wall of the top housing section 19. The apparatus 1 may include a printing unit not shown, adapted to produce a hard copy, not shown, of the projected image 5. A projection lamp 22 is mounted within the base 18 and projects the light beam 23 upwardly through a slot and into a lens unit 24 in the bottom wall of the top housing section 19. An image enlarging system, not shown, directs the image onto the display screen 6. A pair of track units 25 is formed on the base 18 within which a suitable fiche carriage unit, not shown, may be mounted. In the illustrated embodiment of the invention, a film strip adapter unit 26 is constructed and shown in corresponding location on the base 18, and more clearly shown in FIG. 2a. In the assembled relation, the film strip 2 is aligned in the projection section 4 with the projection lamp 22.

More particularly, the carriage unit 26 includes a U-shaped support plate 28 having a pair of laterally spaced track members 29 and 30 for mating location with the longitudinal track units 25 on the base 18. An adaptor support plate 31 is secured to the plate 28, and a film plate assembly 32 is releasably attached to plate 31. Assembly 32 may be constructed for either the conventional 16 mm or 35 mm film strips presently used in commercial practice. The assembly 32 includes a mounting plate 33 and a pivoted upper film cover 34 which is pivotally attached as at 35 and is adapted to be lifted for location of the film strip within unit 32 and then closed to hold the film strip 2 in a flat condition in alignment with the projection lamp beam 23 for projection of the image. Suitable guide rollers 38 and 39 are provided to the opposite sides of the cover 34 for holding and passing of the film strip 2 through the projection section 4 in alignment with the projection openings as the film strip 2 moves rapidly or slowly between the film reel 3 and the take-up reel 8. A reversible counter 40 is shown mounted to the one side of the unit 34, and may be driven from a suitable film driven readout assembly, not shown, for creating a numerical reference as to the position of the film strip 2 within the projection section of the reader. Plate 28 projects forwardly of the unit 32. A control panel 42 is secured to the forward end of the plate 28. The control dial 9 is mounted to the panel 42 and coupled to a reheostat and switch unit 43, which as subsequently described is specially constructed to provide automatic speed and directional control of the drive assemblies 10 and 11. Generally, as shown in FIG. 2, the control dial 9 is mounted over a setting indicator 45 and has an off position from which is rotated in opposite direction for corresponding movement of film strip 2. Thus, clockwise dial rotation causes the film strip 2 to move to the right, while counterclockwise rotation causes the film strip 2 to move to the left, as viewed in FIG. 1. A main on-off switch 46 is mounted to the front of panel 42. The panel also covers the counter 40 and includes a display opening through which the counter is read.

As illustrated most clearly in FIG. 2, the control knob or dial 9 is located with an "off" position and is adapted to be reversely rotatably positioned. Clockwise rotation from a top center position, as shown in FIG. 2, results in a forward drive energization of the take-up reel drive system 11. This results in the forward movement of the film strip 2 through the projector unit 4, and winding of the film strip 2 upon the take-up reel 8. The position of the control dial 9 on the right side includes a rapid, forward transport position in the upper right first quadrant in combination with a slow speed drive range in the immediately lower right fourth quadrant.

Rotation of the control dial 9 to the opposite side, or counterclockwise as viewed in FIG. 2 from the off position, results in a corresponding fast and slow speed mode of control of the reel drive system 10 for corresponding fast or slow speed rotation of the reel 7. This, of course, causes a corresponding rewinding of the film strip 2 in the reel 7 and corresponding positioning of the extended portion of the film strip 2 within the projector unit 4.

The speed during each slow-speed mode is proportional to the setting of the dial 9.

The reel 7 and its associated drive system is mounted on an extension bracket 48 which is secured to the one side of the film strip support plate 31. Similarly the take-up reel and its associated drive system is mounted on an extension bracket 49 which is similarly secured on the opposite side of the support plate 31.

As previously described, a significant feature and teaching of the present invention is particularly directed to the construction of the drive systems which in the illustrated embodiment of the present invention are constructed as essentially corresponding drive units 10 and 11. The drive unit 10 is particularly described in detail. The corresponding elements of the take-up reel drive unit 11 are identified by corresponding primed numbers for simplicity of explanation. Differences between the drive systems are also described to clearly and fully set forth the illustrated embodiment of the present invention.

The cartridge drive unit 10 is disclosed in greater detail in FIGS. 3 and 8. Referring particularly to FIGS. 3 and 4, the cartridge drive unit 10 includes a pulley train support 50 attached to the front wall of the L-shaped extension bracket 48 with the output shaft 12 projecting forwardly through the front wall to the front side of the printer reader unit 1. A reel coupling 52 is secured to the end of shaft 12 and is adapted to couple the film reel 7 for rotating the reel 7.

The pair of drive motors 14 and 15 are connected to the aft side of the pulley train 16 which is a speed reduction unit. The motor 14 is connected through a part of the pulley train 16 (FIG. 4) and operates to establish a high speed rotation of the output shaft 12 and therefore the reel 7. The second or slow speed motor 15 is connected through the complete pulley train 16 and operates to establish a slow speed rotation of the shaft 12 and therefore the cartridge reel for corresponding slow speed positioning of the film strip 2. One and only one of the motors 14 or 15 is energized at any given time. The particular motor, and the speed at which the slow speed motor 15 is energized is controlled by the selective positioning of the rotary control dial 9.

An output clutch unit 55, shown in FIGS. 7 and 8, connects the output shaft 12 to an output gear of the pulley train 16. A similar clutch unit is provided in drive unit 11 for take-up reel 8. The clutches 55 and 55' are mechanically coupled by a mechanical link 56 and electrically set by a solenoid unit 57. The solenoid 57, as hereinafter described, is actuated as a result of the rotation of the control dial 9 between the forward and reverse drive positions. The clutch units 55 and 55' are specially constructed to establish effective drive engagement of the drives to the corresponding output shaft 12. When reel drive unit 10 is energized, reel 7 and its supporting shaft 12 are coupled by corresponding clutch unit 55 to the associated drive unit 10 and therefor are free to rotate within the clutch unit. The take-up reel 7 may then be driven to wind the film strip 2 onto the reel 7 and pull the film strip 2 from the take-up reel 8 through the projector unit 4. When it is desired to wind or feed the film strip 2 to take-up reel 8, the setting of the clutch units 55 and 55' are reset or released, and the energizing of unit 11 set the clutch 55', thereby engaging the shaft 13 to the related pulley train 16' for powered rotation of the reel 8 for winding of the film strip. The corresponding clutch unit 55 of the drive system 10 is of course released such that the take-up reel 8 is free to rotate during such wind operation.

More particularly, the pulley train 16, as noted, is a speed reduction system consisting of a series of pulleys connected in series by similar coupling belts, as presently described. Generally, each pulley may be a readily produced molded plastic pulley having appropriate flanges and hubs as hereinafter described. Similarly, each belt may be a similar rubber or polymer belt having integrally molded teeth on the one surface to produce positive movement. Such construction provides a quiet, long-life pulley system at an economic cost factor and of a reliable construction. However, within the scope of this invention, any other system which provides the appropriate coupling may of course be used such as a gear train, a chain and sprocket drive and the like.

In the illustrated preferred embodiment of the invention, the pulley train includes first and second pulley reduction stages 57 and 58 which are connected in series between the slow speed motor 15 and the output shaft 12. The high speed motor 14 is coupled to an intermediate common shaft 59 of the two series connected stages 57 and 58, and thus is operative only through the second stage 58. The two series-connected stages 57 and 58 substantially reduce the output speed such that the output shaft 12 rotates at a very substantially lesser speed than the output speed of the slow speed motor 15. The second stage 58 also reduces the output speed but by a much smaller ratio whereby the output shaft 12 has a significantly higher rotational speed when the high speed motor drive 14 is energized. The common connection at the shaft 59 between the two first and second stages 57 and 58 includes one-way clutch means to provide proper coupling and de-coupling whereby only the energized motor 14 or 15 is operatively coupled to the pulley train 16 while the de-energized motor 14 or 15 and the associated connecting means is operatively de-coupled. Thus, when the high speed motor 14 is energized, the first stage 57 and pulley train 16 slips, or idles and therefore the slow speed motor 15 and the first stage 57 are effectively de-coupled from the high speed motor 14 and the second stage 58. Conversely, when the slow speed motor 15 is energized, the first and second stages 57 and 58 of the pulley train 16 are coupled together, while the high speed motor 14 slips and automatically de-couples the motor and coupling of the common shaft 59 and therefor the pulley train 16.

Referring particularly to FIGS. 3 and 4, the pulley train support includes a pair of spaced support plates 50 and 60 connected by suitable spacer-screw units 61. The motors 14 and 15 are mounted to the back plate 60 with the shaft coupled to the pulley train 16 through a suitable opening in the plate 60.

The first stage 57 includes a small driven pulley 63 which is directly coupled and affixed to the output shaft 64 of the slow speed motor 15. The pulley 63 may of course be connected to the shaft 64 in any suitable manner as by a press fit, a key, a connection with a small retaining ring or other suitable means for holding of the pulley to the shaft. The pulley 63 is thus driven directly from the low speed motor 15.

A large idler pulley 65 is rotatably supported on an adjustable shaft 66 secured between pulley support plates 50-60. The adjustable shaft 66 permits proper tensioning of the belts. The idler pulley 65 is aligned with pulley 63 and is coupled thereto by a pulley belt 67. The small to large pulley coupling results in a first proportional spaced reduction in the output speed of the motor 15. In the first stage, the large pulley 65 has a second small pulley 68 attached to it as by an integral axially aligned extension. The large pulley rotation is directly and correspondingly transmitted to the small pulley 68. A second large pulley 69 is rotatably mounted on the common shaft 59 of the pulley train 16 and coupled to the small pulley 68 by a similar pulley belt 70. This results in a further speed reduction in the first stage 57 of the pulley train 16. The first stage 57 is connected to the second stage 58 through a special clutch or coupling means 71, as presently discussed and shown in FIG. 6.

The second stage 58 of the pulley train 16 is similarly constructed with two successive speed reductions, as follows. A small pulley 72 is rotatably mounted on the common shaft 59. The end of pulley 72 facing the pulley 69 includes end projections 73 which mate with slots or recesses 74 in a flanged coupler 75 also rotatably mounted on shaft 59. The coupler 75 fits within a lateral hub 76 on the adjacent end face of the pulley 69. A coil spring 77 is wound closely and with a snug fit onto coupler 75 and a loose fit within the hub 76. The spring end 78 within the hub 76 is bent outwardly into a slot 78a in hub 76. Rotation of the large pulley 69 is transmitted to the coil spring 77 via the end coupling member 78. Rotation in the one direction winds the coil 77 onto the hub coupler 75 and transmits the rotation. Opposite rotation of pulley 69 tends to unwind the spring 77 and de-couples the coupler pulley. The small pulley 72 of the second stage 58 is thus coupled to the fixed large pulley 69 of the first stage 57 when the low speed motor 15 drives the pulley 69. The pulley 72 is correspondingly coupled by a belt 79 to a first large pulley 80 of the second stage 58. The large pulley 80 is rotatably mounted on a shaft 81 and includes a small pulley 82 secured to one side for simultaneous rotation. A second belt 83 of the second stage connects the small pulley 82 to a second large pulley 84 which in turn is connected by the controlled clutch unit 55 to the output shaft 13. The second stage 58 provides a second or further reduction in the rotational speed appearing at the small input pulley 72 of the second stage 58. Thus, with low speed motor 15 energized, the output shaft 12 thus rotates with a four step speed reduction and establishes a relatively low speed movement of the film strip 2 for accurate positioning within the printer-reader 1.

The small common input pulley 72 of the second stage 58 is also connected by a separate one way clutch unit 85 to the output of the high speed motor 14, as also shown in FIG. 6. As shown most clearly in FIG. 6, the two clutch units 71 and 85 to the opposite sides of the pulley 72 are thus selected and constructed such that they selectively couple the corresponding driven input to the small pulley 72 while separating or de-coupling of the pulley from the other inoperative input.

More particularly, as viewed in FIG. 6, a small flanged hub 86 is rotatably mounted on the pulley support shaft 59, with the flanged end abutting the small pulley 72 and connected thereto by a diametrical projection and slot coupling 87 similar to the interconnection of pulley 72 to the coupling hub 75. A coil spring 88 is wound about the hub 86 within a cup-shaped coupler 89, with one end bent outwardly, as at 89a, and located in a slot in the coupler 89 which is affixed to the high speed motor shaft 90. Energization of the motor 14 results in rotation of the coupler 89 in a direction tending to wind the coil spring 88 onto the hub 86. As in the previous clutch units, the forced winding direction of the coil spring 88 results in a tightening of the coil spring onto the hub so as to transmit the rotation of motor 14 to the hub and to the coupled common pulley 72. The fast speed motor 14 is thereby connected directly to the second stage 58 of the speed reduction and produces high speed drive of the cartridge reel 7 for fast rewind of the film strip 2.

Simultaneously, the driving of the small pulley 72 from the fast speed motor 14 establishes a de-coupling of such pulley 72 from the first stage speed reduction 57 of the pulley train 16 and the slow speed motor 15. Thus, with pulley 72 driven, the associated coupler 75 of the one way clutch is simultaneously rotated. The coupler 75, however, rotates freely within the coil spring 77, thereby avoiding transmission of the drive force to the hub 76 of pulley 69 of the first stage, and effectively de-couples the first stage from the system.

The cartridge reel 7 is thus driven freely without undue loading of the drive system by the first stage 57 and particularly the low speed motor 15.

Thus, as shown, the coupler 74 and its spring 77 and the coupler 86 and its spring 88 are common assemblies with the springs properly wound to produce the described clutch action.

In summary, operation of the low speed motor results in the driving of the pulley unit through the first and second speed reduction stages as a result of the connection by the one-way coupling input 71 between the large pulley 69 and the small pulley 72. The high speed motor 14 is de-coupled from the system as a result of the one way coupling unit 85. Conversely, when the high speed motor 14 is energized, the coupling unit 85 is effective to connect to the second stage 58 while the opposite coupling unit 71 is operative to de-couple the first stage.

This selective energizations of the two motors 14 and 15 provide for a high speed drive mode in which rapid transfer of the film strip is created, followed by a slow speed drive mode in which accurate positioning within the projection unit 4 can be made, under the manual control and setting of the control dial 9.

In a film reader, the film speed preferably varies between a low read scan shaft speed of about 3½ RPM, an intermediate pattern-detection scan speed of about 35 RPM and a fast forward or rewind speed of about 350 RPM. The movement during the scan speed should be extremely smooth. Thus, in a film reader the image is magnified and any momentary jog in the film movement is similarly magnified and would make reading difficult. Thus, in a practical application, a speed change ratio of about 100 to 1 is desirable. With small, inexpensive motors such as are preferably used in this application, the motor should have a speed of at least 300 RPM to prevent a noticeable step resulting from the "couging" effect in the motor. These motors used at a low end speed of 500 RPM have worked satisfactorily. The speed reduction train thus produces a reduction ratio of about 150:1 to produce the slow scan speed of a few RPM. The second stage alone, produces a reduction ratio of about 12¼ to 1. Thus, motor speeds range from a hundred RPM up to 4000 RPM and is set by varying the voltage supply to the motor.

During the rewind operation, the take-up reel or forward drive motor assembly 11 is de-energized.

Further, in order to prevent loading of the active drive assembly or unit, the pulley train 16 of the opposite drive assembly or unit is de-coupled from the output shaft by the output clutch unit 55.

Thus, when the drive assembly 10 is energized, the rewind or cartridge drive assembly 11 is de-coupled from the take-up reel shaft 13 and conversely, when drive assembly 11 is energized, the drive assembly 10 is de-coupled from the cartridge shaft 12. Corresponding coupling units 55 and 55' are provided for each assembly and the unit 55 for drive assembly 10 is shown in FIG. 7 and described.

In the illustrated embodiment of the invention, a clutch drive includes a special coil unit having the first one or more spring coils 91 wound slightly larger and about the output shaft 12 and the next one or more coils 92 wound larger than 91 and in interference with hub 95. The outer end of coil 91 is bent as at 93 and coupled to a drive hub 94 on the output gear 84 of pulley train 16. The drive of the pulley 84 rotates spring 91 to couple the pulley to the output shaft 12 as in the previously described driving connections, and establish rewind rotation of the shaft 12 and the interconnected reel 7. Coupling units 55 are coupled to each to establish opposite setting whereby only the one appropriate unit is engaged. The clutch unit 55 further includes a control hub 95 journaled on the shaft 12 to the one side of hub 94 (as shown in FIG. 7) and includes an enlarged opening extending over the spring coils 91 and 92. The coil turns 92 fit snuggly within the hub spring and the free end turn 96 of spring 92 particularly interacts the inner wall 96a of the control hub 95 as presently described. In the drive direction of the output pulley 84 of pulley train 16, the spring coils 91 wind onto shaft 12 to drive the shaft while the end turn 96 and the other spring coils 92 slide on the inner wall 96a and inner hub surface of the hub 95. When the drive stops, coil 91 is wound on the shaft with the end of coils 91 held in place inside the hub. A control lever 97 is secured to an outer flange on the hub 95. A reset spring 98 is wound about the outer end of hub 95 and one end is coupled as by a bent end 99 to the hub 95. Thus, when hub 95 is rotated in the direction or the spring windings then the coils 92 will slip on the inner hub surface. When the hub 95 is allowed to return via the return spring 98 and is thereby reversely rotated then the coils 92 will turn with the hub and release tension on coils 91. The reset spring 98 biases the hub to a standby position. When the coils 91 are wound onto shaft 12, the coils 91 can be released by moving of coils 92 opposite the spring wind direction. Thus, movement of the end coil turn 96 results in a slight enlargement of coils 91. Only a minute increase in diameter is necessary to relieve the holding force of the coiled spring coils 91 and thereby reset the coupling to a de-coupled state. The lever 97 is positively and momentarily rotated through a release position against the force of the reset spring 98. The movement of lever 97 rotates hub 95 first to slip coils 92 and then to drag coils 92 which enlarge the coils 91. The released spring coils 91 in turn effectively disengages the drive pulley train form from the output shaft 12. The rubbing engagement of the coil 92 on the control hub will tend to generate heat as well as wear. However, the hub can be readily formed of suitable material such as a low friction and suitable high temperature plastic to provide a long useful life. The output clutches 55 and 55' thus provide means for de-coupling of the respective pulley trains and output shafts. The energization of one of the motors 14, 14', 15 or 15' then re-establishes a drive connection, such that a single drive unit is energized and operational so long as the previously set coils 91 are released and only one motor is energized.

In the illustrated embodiment of the present invention, the clutch units 55 are mechanically interconnected by the connecting link which is interconnected to the clutch levers 97 and 97'. Solenoid 57 is mounted on drive assembly unit 10 and is coupled to the levers 97 and 97' to momentarily move the levers and reset the output coupling units 55 and 55' of the drive assemblies 10 and 11. In the solenoid de-energized state, the clutch units 55 and 55' are biased by the spring 98 to the standby position in which the reel drive 10 and the opposite take-up reel drive 11 are de-coupled.

In the illustrated embodiment, the dial unit 9 at the "off" position is operable to pulse the solenoid 57 therefore whenever the dial unit 9 is rotated to reverse the drive state and produce a reversed operation, solenoid 57 is pulsed to release a set output clutch and permit resetting of the proper clutch. The system provides a suitable interlock with a cross-over time delay in the energization of the motors, such that even rapid movement from one drive direction drive to the other of unit 9 permits proper solenoid operation.

Thus, the film 2 is directly passed through the projection unit in response to the appropriate energization of the drive units 10 and 11. Further, the actuated and coupled drive unit 10 or 11 is operational in either the high speed transfer mode or the low speed transfer mode as a result of the appropriate energization of the motors.

In the illustrated embodiment of the invention, the control dial unit 9 simultaneously controls the selection of the drive units to be energized, the fast or slow speed mode and the speed in the slow speed or scan mode. The original rotation from the off position selects the directional drive of the film strip 2. The degree of rotation selects fast or slow speed. In the slow speed mode, the rotational speed is further adjusted by the setting of the dial unit 9.

Although any suitable control circuit can be provided, a particularly unique control circuit is shown in FIG. 10, wherein each of the fast and slow motors 14 and 15 is schematically illustrated with the armature circuits connected to selectively receive D.C. power. A fast speed line 101 is connected in common to the opposite polarity terminals of the fast speed motors 14 and 14′. A slow speed line is connected in common to the opposite polarity terminals of the slow speed motors 15 and 15′. The opposite side of the motors 14–15 selectively connected to ground 103a by the positioning of the control dial unit 9, as follows.

The control dial 9 is particularly coupled to a wafer control switch 103 and to a potentiometer 104. The wafer control switch 103 and the potentiometer 104 are readily available commercial devices which can be secured to a single shaft/connected to the dial shaft, as diagrammatically shown in FIG. 9, which is relatively simple and reliable drive circuit of a more or less conventional drive. The wafer switch 103 controls the connection of one of the motors 14–15, and only one of the motors to ground 103 and thereby operatively into the circuit at any given time. The potentiometer 104 provides a variable resistance which controls the speed of the motor within a given range during the slow speed mode. The wafer switch 103 is shown as a five segment wafer switch having a common rotatable contact 106 coupled to the dial shaft. The rotatable contact 106 is coupled directly to the common ground line 103a. The positioning of the contact 106 on the five segments 107, 108, 109, 110 and 111 thus provide controlled grounding of any one segment at any given time. The five segments are symmetrically located about a circle. The segment 111 is a short segment which is interconnected to operate the solenoid, and introduce a delay into operation of the motors. The segment 111 is centrally located for engagement with the movable contact in the "off" position.

The level of energization during the slow speed mode only is controlled by the positioning of the potentiometer unit 104. Thus, the potentiometer unit 104 as illustrated includes similar resistors 128 and 128a connected to the opposite sides of the "off" position. The one end of each potentiometer resistor 128 and 128a is connected to ground 103a in series with an adjustable zero adjust potentiometer 128b and 128c. The resistors are small potentiometers to permit start-up voltage adjustment.

To the opposite sides of this short segment 111 slow speed segments 109 and 110 are located, with the fast speed segments 107 and 108 located next to the slow speed segments. The slow speed segments span slightly less than ninety degrees of the circle. The segments are similarly connected directly to the return or ground sides of the slow speed motors. This provides the grounds return path. Immediately adjacent and spaced slightly from each slow speed segment is a corresponding fast speed contact segment, which spans somewhat less than ninety degrees. The high speed segments are also connected to the corresponding armature of the fast speed motors to complete the ground or return path. The high speed motor circuit provides a higher voltage to operate the motor at a higher speed to provide the desired film speed movement. Directional and back surge diodes connect the motor armature and control elements in circuit in accordance with known practice.

Thus, the illustrated control circuit includes a solid state control circuit adapted to interconnect the drive motors 14–15 to a suitable twenty-eight (28) volt A.C. source 113 for moving of the film strip 2. The A.C. source may of course be provided from any suitable conventional A.C. distribution power supply such as the conventional electric power utility in the United States; with an appropriate step-down transformer. The A.C. voltage is rectified by a known full wave bridge rectifier 114 to provide a suitable D.C. power supply for energizing the motors. A high voltage circuit 115 and a separate low voltage circuit 116 are connected between the bridge rectifier 114 and the corresponding fast speed and low speed motor lines 101 and 102. A solenoid circuit 117 is provided for operation of the solenoid 57. A time delay circuit 118 is connected to the fast and slow speed motor circuits 115–116 and to the solenoid circuit 117 to prevent instantaneous reversing of the drive units without appropriate energization of the solenoid 56 and proper operation of the output clutch units 55 and 55.

A regulated power supply 119 provides control operating voltage for the time delay circuit and associated components, as presently described.

The potentiometer is shown schematically as a well known device which includes the rotating contact 127 coupled to the shaft of the control dial unit 9 in common with the rotating contact of the wafer switch 103. Resistors 128 and 128a are correspondingly located for engagement by contact 127 with the movement of the wafer switch contact 106 to the opposite sides of the solenoid contact 111 and thereby provide an adjustable resistance related to the angular positioning of the dial unit 9 for changing of the speed from a slow reading scan speed of a few RPM to an intermediate pattern locating speed of a few hundred RPM to a fast forward or rewind speed of a few thousand RPM. The speeds given are typical and may change as desired or demanded by the application.

More particularly the high speed control circuit 115 includes a voltage regulator 120 coupled to the output of the bridge rectifier 114. A two-stage transistor switch 123 is connected to the output of the bridge network and to the voltage regulator to connect an output voltage to the fast motor line 101 and to a solenoid line 121. The two stage switch 123 is connected into circuit with a timed turn-on to switch-on at a rate which minimizes the acceleration torque on the output spring clutches 55. A control transistor 124 is also connected to switch 123 and is constructed and arranged to interlock or short out motor supply during solenoid triggering.

The slow speed circuit includes the regulated supply 116 connected to the motor line 102, such that the appropriate slow speed motor is energized whenever a slow speed segment 109 or 110 is coupled to switch contact 106. The output of the voltage regulator 116 is controlled by the potentiometer 104 to vary the speed in this mode.

The solenoid control circuit 117 and the time delay or crossover circuit are connected into circuit through the short segment 111 of the wafer switch 103 to momentarily energize solenoid 56 and only thereafter permit energization of a motor. The segment 111 is thus connected to simultaneously trigger the delay circuit 118 and to operate the solenoid circuit 117.

The solenoid control circuit includes a one-shot timer 129 which when actuated establishes a pulse signal to actuate the solenoid 57. Thus, the one side of the solenoid 57 is connected directly to the output of the fast speed voltage regulators line 121 of the fast speed circuit. The return side of the solenoid 57 is connected to ground through a control transistor 130, which is controlled from the timer 129. The crossover network 118 includes a one-shot timer 131 also actuated by the segment 111. This timer 131 has a longer period than the timer 129 and in actual practice twice as long. Timer 131 thus prevents voltage from reaching any motor for two times the time of the solenoid pulse, and thereby allows sufficient time for the output clutches to reset or release. When the wafer contact moves past the switchover segment 111, the contact grounds the switchover segment and triggers the two timers 129 and 131. The timer 129 applies a signal which drives the control transistor 130 to energize the solenoid, while the timer 131 applies a signal to both the high and the low speed circuits to positively hold the motors "off." The solenoid 57 is energized and moves the clutch hubs which are then returned or reset and in so moving release the previously set clutch 55 or 55'. When the one drive unit 10 or 11 is then energized, the corresponding clutch coils 91 or 91' of the corresponding unit 55 or 55' is energized to establish and maintain driving connection while the other drive unit is completely de-coupled to permit the free movement of the corresponding reel under the action of the opposite drive unit.

Thus, the system permits the use of small inexpensive motors which can be of a similar low cost construction. As each motor need only operate about one-quarter of the time, the system of four motors will have a long useful life.

Various modes of carrying out the invention are contemplated as being within the scope of the following claims, particularly pointing out and distinctly claiming the subject matter which is regarded as the invention.

We claim:

1. A multiple speed drive apparatus for transfer of a strip from one reel to another reel and the like, comprising output shaft means for mounting of first and second reel drive members in spaced relation for transfer of the strip therebetween, a separate drive system for each of said output shaft means, each of said drive system being correspondingly constructed and each including a fast drive motor and a separate slow drive motor, a speed reduction train connected between said slow drive motor and the corresponding output shaft means, said train including first and second speed reduction stages connected in series and including a first stage output element and a second stage input element, and a first one-way clutch means connecting said input element of said second stage to said output element of the first stage, said one-way clutch means providing transfer of power from said first stage to said second stage and automatically decoupling of said second stage from said first stage in response to positive driving of the input element of the second stage.

2. The drive apparatus of claim 1 including a second one-way clutch means interconnected between said input element of the second stage and said high speed motor, said second one-way clutch means transferring drive power from the high speed motor to said element and automatically decoupling said input element from the high speed motor in response to positive driving of said input element by said first speed reduction stage.

3. The apparatus of claim 2 wherein each of said one-way clutches include a coil spring wound on a clutch shaft means and operable when wound onto the clutch shaft means to rotate the clutch shaft means, and means connecting one end of said coil spring to said output element of said first stage, means connecting one end of said spring of the second clutch means to the output of said high speed motor means.

4. The apparatus of claim 2 wherein said first stage means includes a small rotating member coupled to said low speed motor, a larger idler rotating member rotatably mounted in alignment with said small rotating member, an endless means coupling said small rotating member to said large rotating member, a second small rotating member coaxially affixed to said first large rotating member, a first stage large output rotating member aligned with said second small rotating member, a second belt means connecting said second small rotating member to said first stage output rotating member, a common shaft means, said output rotating member being rotatably supported on said shaft means, said second rotating member reduction stage including a small input rotating member freely rotatably mounted on said common shaft, said second rotating member stage including a large rotating member aligned with said input rotating member, a belt means coupling said input rotating member to said large rotating member, a second small rotating member affixed to said second stage large rotating member, a second stage output rotating member aligned with said second stage small rotating member, a belt connected between said second small rotating member and said second stage output rotating member, said one-way clutch means coupling said first stage output rotating member to said second stage input rotating member including a hub on said input rotating member, a coil spring wound on said hub, said coil spring being freely rotatable on said hub, one end of said coil spring being affixed to said first stage output rotating member, said coil being wound whereby rotation of said first stage output rotating member winds said coil spring onto said hub and thereby transmits the motion of the first stage output rotating member directly to said hub and thereby to said second stage input rotating member, positive rotation of said second stage input rotating member being operable to freely rotate said hub within said coil spring without transfer of forces to said first stage output rotating member, said second one-way clutch means including a second hub on the opposite end of said second stage input rotating member, a coil spring wound on said second hub and permitting free rotation of said second hub therein, an end of said second coil spring being coupled to said high speed motor and constructed and arranged whereby the operation of said high speed motor winds said second coil spring onto said second hub to rotate said second stage input rotating member and whereby positive driving of said second stage input rotating member rotating said second hub freely within said second coil spring of said second clutch means.

5. The apparatus of claim 1 wherein each of said drive motors is a similarly constructed motor.

6. The apparatus of claim 1 wherein each of said output shafts is coupled to said train through a releasable output clutch means, each of said releasable output clutch means including said second stage output freely rotatable on said output shaft, a coil spring unit having a first spring coil wound on said output shaft and having an end connected to said second stage output member whereby said output drive of said output member winds said coil onto said output shaft to transmit the rotation of the output member to said output shaft, a decoupling means for moving said clutch release coil to move the drive coil to a release position, resilient means urging said de-coupling means to a reset position, and control means coupled to said de-coupling means and to activate the de-coupling means and de-activate the first and second drive means.

7. The apparatus of claim 6 wherein said drive coil and release coil are formed as an integral wound assembly with the release coil larger diameter, said de-coupling means including a hub member rotatably mounted on said shaft encircling said release coil, an electric drive coupled to move said hub member, said resilient means urging said hub member to a standby position, said release coil having an outer end turn slidably engaging the inner surface of the hub member, and said control means being operable to pulse said electric drive and thereby move said hub member and end turn to release said drive coil.

8. The apparatus of claim 1 having an output clutch means coupling the speed reduction train to the output shaft and including a common operator means to actuate the clutch means to release the output shaft, control means including a movable elemet energizing said one drive system in response to movement in a first direction from a neutral position and energizing of the second drive means in response to movement in a second direction from said neutral position, said control means having a means for operating of said operator means at said center portion and including time delay means coupled to said drive means to positively prevent energization of said drive means for a short momentary period after said control means is moved in either said first or second direction and thereby positively preventing energization of a drive means prior to complete actuation of said operator means.

9. A motorized transport apparatus for transfer of an elongated strip wound on a support storage means, comprising an output shaft adapted to be coupled to a film support roll, a first high speed drive motor, a second low speed drive motor, a first speed reduction trains having an input drive connected to said low speed drive motor and an output drive connected to said output shaft, said speed reduction train including an intermediate one-way drive coupling connecting said output drive to said input drive and said coupling operable to transmit force only to said output drive and thereby permitting independent drive of said input drive, a second one-way drive coupling connecting said high speed motor to said input drive and operable to transmit force from said high speed motor only and thereby permitting the independent drive of said input drive.

10. The motorized transport apparatus for transport of an elongated strip between a storage means and a receiving means, comprising a first drive means having an output means adapted to be coupled to said storage means and operable to drive said storage means to move the strip therein, a second separate drive means having an output means and adapted to be coupled to said receiving means and operable to drive said receiving means to move said strip therein, each of said output means of said drive means being constructed and arranged to permit free movement of the output means and the strip during the operation of the opposite drive means, each of said drive means including a first and second drive motor, a series speed reduction train connected between a first of said motors and said output shaft and having means connecting a second of said motors to a portion of said train and constructed and arranged whereby only the motor energy is operatively coupled to the train whereby energization of one motor establishes a high speed drive of the support means and energization of the second motor establishes a low speed drive of the support means.

11. The apparatus of claim 10 wherein said train incudes an intermediate clutch coupling including first one-way clutch means connected to said low speed motor and having an input member connected to an output member, and a second one-way clutch means connecting the high speed motor means to said input member and operable to transmit force only from said high speed motor means.

12. The apparatus of claim 11 wherein each of said one-way clutches includes a coil spring wound on a shaft and operable when wound onto the shaft to transmit force to rotate the shaft, and means connecting one end of said spring to the driving force means.

13. The apparatus of claim 12 wherein a releasable clutch means connects said motors to said output means, means connected to said releasable clutch means whereby only one of said clutch means is operable to actuate the corresponding drive means.

14. The apparatus of claim 13 including a common control means movable in alternate directions for energizing said drive means and having an "off" position, said control means having a means for operating output clutch means at said "off" position and time delay means to positively prevent energization of said drive means for a short momentary period.

15. In a film strip adaptor adapted to be coupled to a microfische reader, comprising a support base having a central section adapted to be inserted into a microfische reader, said central section including a projection means aligned with the projection system of said microfische reader, a first film reel drive means connected to one side of said central section and located to the one side of the microfische reader in the assembled position, a second film drive means secured to the opposite ends of said central section and located to the opposite side of said microfische reader in the assembled relation, each of said drive means including an output means driven from a high speed motor and a low speed motor, output clutch means connecting said motors to said output means, film size adaptor unit releasably secured to the side of said central section and including roller means for guiding of a film strip through said projection means, a control section secured to said central section projecting outwardly of said projection means, drive control means mounted on said control section and including a movable control means having a center position and movable in a first direction from said center position and in a second opposite direction from said center position, a switch means coupled to said control means and having a center contact and first and second spaced motor contacts to opposite sides of said center contact, said first set of motor contacts being connected to provide energization of the fast speed motor and slow speed motor of the first drive means, said second set of spaced contacts being connected to supply power to the slow speed motor and the fast speed motor of the second drive means, said center contact being connected to actuate said output clutch means.

16. The adaptor unit of claim 15 wherein said center contact is connected to prevent energization of either said first or second drive means.

17. A motorized transport apparatus for transport of an elongated strip between a storage means and a receiving means, comprising a first drive means having an output means adapted to be coupled to said storage means and operable to drive said storage means to move the strip therein, a second separate drive means having an output means and adapted to be coupled to said receiving means and operable to drive said receiving means to move said strip therein, first and second releasable clutch means connecting said first and second drive means to said corresponding output means, each of said clutch means being set in response to operation of the corresponding drive means and having a reset means, reset means connected to said releasable clutch means whereby said clutch means are simultaneously reset, and control means to selectively actuate the drive means.

18. The apparatus of claim 17 including a common control means movable in alternate directions for energizing said drive means and having an "off" position, said reset means being connected to operate said clutch means at said "off" position, and time delay means connected to said control means to positively prevent energization of said drive means for a short momentary period.

19. The apparatus of claim 17 wherein each of said output clutch means includes a coil spring wound on an output shaft and operable when wound onto the shaft to transmit force to rotate the shaft, and means connecting one end of said spring to the drive means, an extension of said coil being coupled to a reset means operable to move the coil to unwind the coil from the shaft.

20. The apparatus of claim 19 wherein said coil extension is a second coil section of a greater diameter than sid coil, a reset hub is rotatably mounted in telescoped relation to said wound coil section, said second coil section having at least one reset turn slidably engaging the inner wall of said hub and sliding thereon in response to actuate of the drive means, and means to move said hub to move said reset turn to release said coil.

21. A motorized transport apparatus for driving a shaft, comprising a drive means having a rotating output means, an output clutch means includes a drive coil spring wound on said output shaft and operable when wound onto the shaft to transmit force to rotate the shaft, and means connecting one end of said spring to the rotating drive means, a coil extension of said drive coil spring having a greater diameter than said coil, a release hub rotatably mounted in telescoped relation to said wound coil extension, said second coil extension slidably engaging the inner wall of said hub and sliding thereon in response to actuation of the drive means, and means to move said hub to move said coil extension to release said coil spring.

* * * * *

UNITED STATES PATENT AND TRADEMARK OFFICE
CERTIFICATE OF CORRECTION

PATENT NO. : 4,456,201
DATED : June 26, 1984
INVENTOR(S) : RONALD J. FRIAS ET AL It is certified that error appears in the above-identified patent and that said Letters Patent are hereby corrected as shown below:

Col. 11, line 64, delete "or" and substitute therefore ---of---, Col. 14, line 14, cancel "55 and 55" and substitute therefore ---55 and $55^1$---, Col. 16, line 1, cancel "larger" and substitute therefore ---large---, Col. 17, line 17, cancel "elemet" and substitute therefore ---element---, Col 17, line 36, cancel "trains" and substitute therefore ---train---, Col. 17, line 44, cancel "input" and substitute therefore ---output---, Col. 18, line 1-2, cancel "incu-des" and substitute therefore ---in-cludes---, Col. 18, line 27, cancel "microfische" and substitute therefore ---microfiche---, Col. 20, line 5, cancel "sid" and substitute therefore ---said---, Col. 20, line 21, after "said" delete "second"

Signed and Sealed this

Sixteenth Day of April 1985

[SEAL]

Attest:

DONALD J. QUIGG

Attesting Officer

Acting Commissioner of Patents and Trademarks